United States Patent

Kapust et al.

Patent Number: 5,583,784
Date of Patent: Dec. 10, 1996

[54] FREQUENCY ANALYSIS METHOD

[75] Inventors: Rolf Kapust, Stegaurach; Dieter Seltzer, Erlangen, both of Germany

[73] Assignee: Fraunhofer-Gesellschaft zur Forderung der Angewandten Forschung e.V., Germany

[21] Appl. No.: 241,851

[22] Filed: May 12, 1994

[30] Foreign Application Priority Data

May 14, 1993 [DE] Germany .......................... 43 26 297.5

[51] Int. Cl.$^6$ .............................. G10L 5/00; G10L 7/02; G10L 9/00
[52] U.S. Cl. .......................................... 364/484; 395/2.12
[58] Field of Search ................................. 381/36, 31, 35, 381/36, 37; 395/2

[56] References Cited

U.S. PATENT DOCUMENTS

| | | | |
|---|---|---|---|
| 3,665,314 | 5/1972 | Leuthold | 325/141 |
| 4,620,069 | 10/1986 | Godwin et al. | 179/175.3 |
| 5,142,656 | 9/1992 | Fielder et al. | 381/37 |
| 5,222,189 | 6/1993 | Fielder | 395/2 |
| 5,357,594 | 10/1994 | Fielder | 395/2.2 |
| 5,394,473 | 2/1995 | Davidson | 381/36 |

FOREIGN PATENT DOCUMENTS

4011577  10/1991  Germany .

*Primary Examiner*—Emanuel T. Voeltz
*Assistant Examiner*—Demetra R. Snith
*Attorney, Agent, or Firm*—Wolf, Greenfield & Sacks, P.C.

[57] ABSTRACT

A frequency analysis method comprises using a window function to evaluate a temporal input signal present in the form of discrete sampled values. The windowed input signal is subsequently subjected to Fourier transformation for the purpose of generating a set of coefficients. In order to develop such a method so that the characteristics of the human ear are simulated not only with respect to the spectral projection in the frequency range, but also with respect to the resolution in the temporal range, a set of different window functions is used to evaluate a block of the input signal in order to generate a set of blocks, weighted with the respective window functions, of sampled values whose Fourier transforms have different bandwidths, before each of the simultaneously generated blocks of sampled values is subjected to a dedicated Fourier transformation in such a way that for each window function at least respectively one coefficient is calculated which is assigned the bandwidth of the Fourier transforms of this window function, and that the coefficients are chosen such that the frequency bands assigned to them essentially adjoin one another.

7 Claims, 11 Drawing Sheets

FREQUENCY ANALYSIS METHOD

The present invention relates to a frequency analysis method in which a window function is used to extract overlappingly succeeding blocks of sampled values from an input signal present in a time-discrete fashion in the form of blocks of sampled values, whereupon the blocks thus evaluated using the window functions are subjected to Fourier transformation for the purpose of generating a set of coefficients, in accordance with the preamble of Patent Claim 1.

Chiefly two different frequency analysis methods are known by means of which it is possible for a temporal input signal present in the form of sampled values to be transformed into a plurality of coefficients, that is to say into the spectral range. These methods can be classified into so-called subband methods and transformation methods, although transformation analyses and filter bank analyses are initially closely related to one another mathematically.

It is expedient and advantageous for the purpose of audio signal analysis and/or coding to adapt the frequency analysis to the characteristics of the human ear as sound pick-up. In this connection, an important finding of psychoacoustics is that the ear jointly evaluates acoustic events which fall within a specific bandwidth, the so-called frequency group width. Acoustic events outside such a frequency group width are perceived separately.

Figure 2:
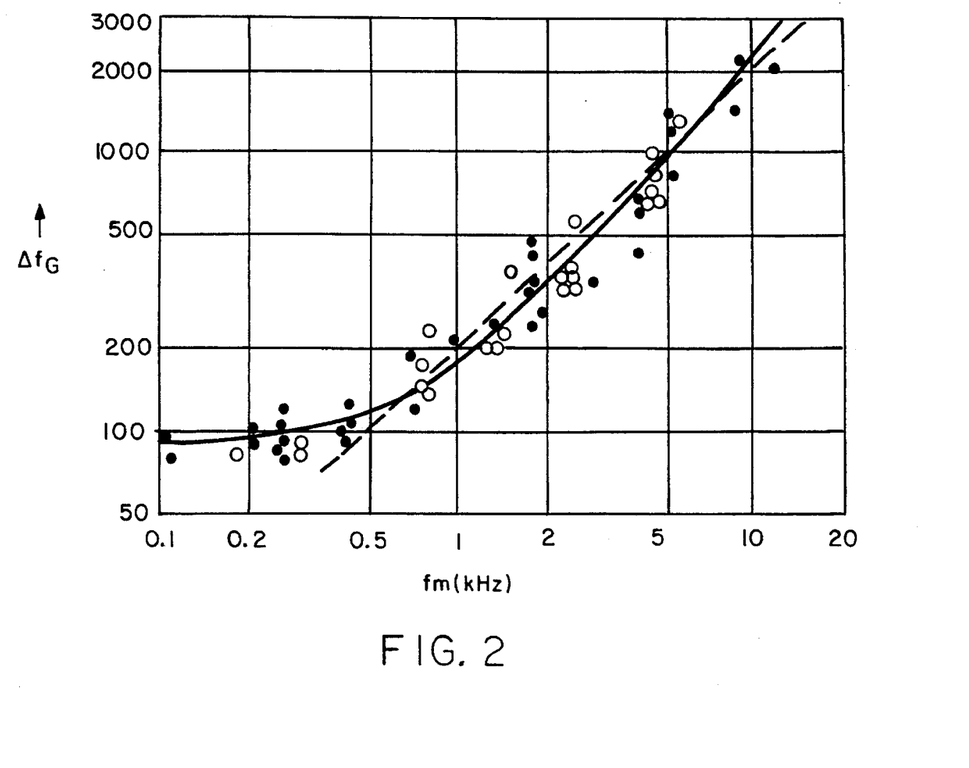
FIG. 2 shows the relationship between the frequency group $\Delta F_G$, as a function of the centre frequency $f_a$.

In contrast to purely technical frequency analyses, the frequency group width is not constant; with increasing centre frequency, its bandwidth also becomes larger. Moreover, the relationship between frequency group width and centre frequency is, as shown in FIG. 2, nonlinear.

In this case, the so-called subband methods make use, for the purpose of spectral analysis, of filter banks which undertake spectral decomposition in accordance with the frequency groups. It is normal to use cascade arrangements of half-band filters for this purpose. It is possible by means of the continued bisection of the baseband with the aid of such a half-band filter cascade to achieve only a rough approximation to the division into frequency groups.

The temporal resolution of band filters is inversely proportional to their respective bandwidth; it therefore becomes finer with increasing bandwidth and is thus well adapted to the characteristics of hearing. However, due to the principle of continued bisection of the baseband, half-band filter cascades produce relatively large deviations of the frequency division from the stipulation by the frequency group division which Zwicker has found for hearing.

Although FFT analyses can guarantee a precise division into frequency groups given a correspondingly fine frequency raster, the temporal resolution is then too coarse and, in particular, constant for all frequency groups, and this in turn also cannot correspond to the characteristics of the human sound receiver, as demonstrated by the perceptibility of pre-echo interference.

In principle, the temporal resolution is given by the reconstruction of a pulse train with the aid of an ideal low-pass filter. The temporal resolution which can be read off from the pulse response of a filter is referred to as "resolution span". It is reproduced in FIG. 1.

Figure 1:
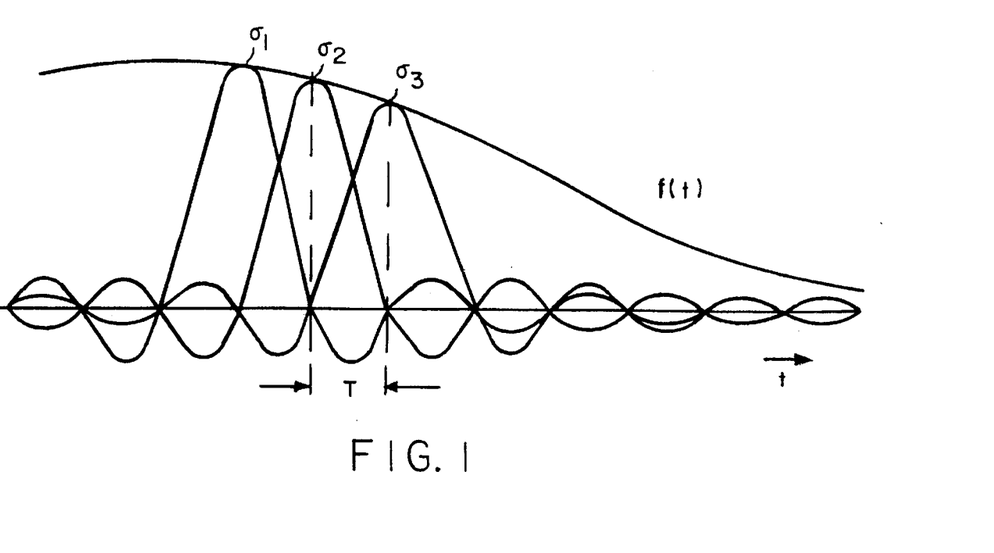
FIG. 1 shows a representation for the purpose of illustrating that the generation of a function f(t) which is band-limited to $F_g$ by superposition of sinx/x functions evaluated using the respective sampled value is possible.

As FIG. 1 shows, the function f(t), which is band-limited to $f_g$, can be generated by superposition of sinx/x functions $\sigma_n(t)$ evaluated using the respective sampled value. The sinx/x functions (slit functions) represent the pulse response of an ideal low-pass filter with the cut-off frequency $f_g$. The temporal resolution of the ideal low-pass filter is T.

The principle is used for ideal interpolators. For this purpose, sinx/x functions are evaluated with the respective sampled value and displaced by a period t which results from the distance from the maximum to the first zero crossing of the sinx/x function. The superposition of all these sinx/x functions produces the interpolated time function. The variation of the continuous timed function reconstructed in this way agrees exactly with the sampled values at the zero crossings of the slit functions. This condition is known as the interpolation condition.

It is precisely this distance from the maximum to the first zero crossing, or the distance of the zero crossing of the sinx/x function which is known as the temporal resolution. It is easy to see that the temporal resolution is equal to the sampling period when the interpolation filter is chosen as a low-pass filter with a cut-off frequency $f_g$ equal to half the sampling frequency $f_a$, that is to say an all-pass filter. The product of bandwidth and temporal resolution is in this case $B \times T = f_a \times \frac{1}{2} f_a = 0.5$. For a specific bandwidth, the temporal resolution given thereby cannot be undershot. By analogy with a similar state of affairs known in physics, this is referred to as the Heisenberg limit. Subband and/or transformation methods for spectral decomposition are to be found in virtually all presently known codes. Both are unsuitable for a representation which is faithful to hearing in the frequency and temporal range. In particular, a measurement method which claims to be able to assess the quality of present coding methods certainly must operate more accurately with respect to frequency analysis; it is only then that the accuracy with which the monitoring thresholds are determined in this regard is higher than in the coder/decoder combinations to be assessed.

The disadvantages of conventional methods, presently applied almost exclusively, for frequency analysis which is faithful to hearing may be illustrated in summary in the following way:

Although subband methods operate at the Heisenberg limit, the frequency group widths are met only coarsely.

Although transformation methods are capable in principle of simulating the frequency group widths to any accuracy, the temporal resolution is however far too coarse, and moreover constant and thus not adequate for hearing.

Although hybrid frequency analyses more effectively approximate the required time/frequency resolution of hearing, exact simulation is also hereby not possible in principle. It is the object of the invention to provide a frequency analysis method which simulates the characteristics of the human ear not only in the frequency range but also simultaneously in the temporal range. This object is achieved by means of a frequency analysis method in accordance with Claim 1.

In accordance with the invention, in a frequency analysis method of the type mentioned at the beginning window functions are used to extract overlappingly succeeding blocks of sampled values from an input signal present in a temporal fashion in the form of sampled values, whereupon the blocks thus evaluated using the window functions are subjected to Fourier transformation for the purpose of generating a set of coefficients, it being the case, however, that such a block of the input signal is respectively evaluated using a set of different, symmetrical window functions of identical length to generate a set of blocks of sampled values weighted with the respective window functions. The Fourier transforms of the window functions also have different bandwidths, caused by the different window functions. A dedicated Fourier transformation can be used to calculate for each of the simultaneously generated blocks of windowed sampled values at least one coefficient which is assigned the bandwidth of the Fourier transforms of this window function, it being the case that the coefficients are chosen such that with reference to their bandwidth the frequency bands assigned to them overlap or are separated from one another only slightly. In other words, the frequency bands assigned to the coefficients adjoin one another essentially without gaps and in a manner free from overlapping.

A preferred exemplary embodiment of the frequency analysis method according to the invention is explained in more detail below with reference to the attached drawings, in which.

Transformation methods can evidently be realized with a substantially lower outlay as filter banks. On the other hand, however, they can be used successfully only if the spectral axis (the frequency axis in hertz) requires representatives arranged in a purely equidistant fashion. Producing a non-equidistant arrangement on the spectral axis via a grouping leads to a realization which is not faithful to hearing form the very start, because it does not work along the Heisenberg limit.

Figure 3:
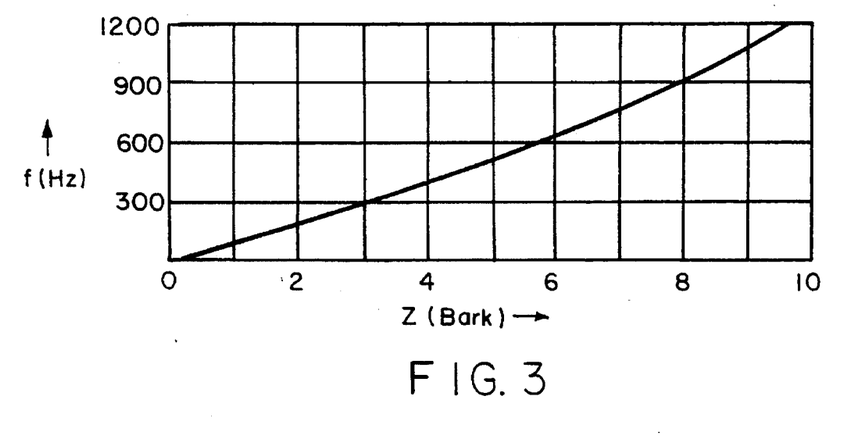
FIG. 3 shows the relationship between a frequency axis in hertz as ordinate and a frequency axis in BARK as abscissa.

However, the relationship between a frequency axis in hertz and a frequency axis in BARK is approximately linear—at least for low frequencies. FIG. 2 [Zwicker, E.; Feldtkeller, R.: Das Ohr als Nachrichtenempfänger (The ear as communication receiver), 2nd ed., Hirzel Verlag, Stuttgart 1967] demonstrates this. The linear relationship becomes clearer when the frequency in hertz is plotted against the tone pitch in BARK, as done by Zwicker in FIG. 3 [Zwicker, E.; Feldtkeller, R.: Das Ohr als Nachrichtenempfänger (The ear as communication receiver), 2nd ed., Hirzel Verlag, Stuttgart 1967]. It can then be seen that the relationship between a frequency axis f in hertz (ordinate) and a frequency axis z in BARK (abscissa) is linear, at least in the lower frequency range up to approximately 5 BARK; this means that the subbands here are of identical width. In the range from 0 Hz to approximately 500 Hz, it is thus possible to speak, to a good approximation, of a linear relationship. It is therefore possible to specify approximately the same frequency group width of 100 Hz for each centre frequency in this range. Here, use is made initially of a Fourier transformation from the temporal range into the frequency range. It can be used here without the customary grouping of spectral values, that is to say with an ideal product of bandwidth and temporal resolution. This yields the advantage of being able to calculate at least the first five spectral coefficients jointly in one run (for example, in a fast discrete Fourier transformation). Normally, approximately 25 spectral lines result when projecting a frequency axis of 0 Hz to approximately 22 kHz onto a BARK axis. They can be regarded as representatives for the bands of frequency group width. The calculation of the first five spectral lines by means of a Fourier transformation must be performed with a step width on the frequency axis which corresponds to the approximately constant frequency group width in this range, that is to say approximately 100 Hz. Consequently, for a sampling frequency of, for example, 48 kHz the calculation must be carried out using a 480 point Fourier transformation. It is then already possible to use the first 5 of the 240 spectral lines, and the remaining 235 spectral lines must be discarded, since towards higher frequencies they no longer represent a frequency group width (their bandwidths are too narrow for the purpose). Because of the reciprocity of bandwidth and temporal resolution B×T=0.5, it is necessary for the required design along the Heisenberg limit to choose, for the purpose of obtaining wider bands, correspondingly narrower windows in the temporal range for further Fourier transformations which are to be calculated separately; the latter then also yield a better temporal resolution—as desired.

Figure 4:
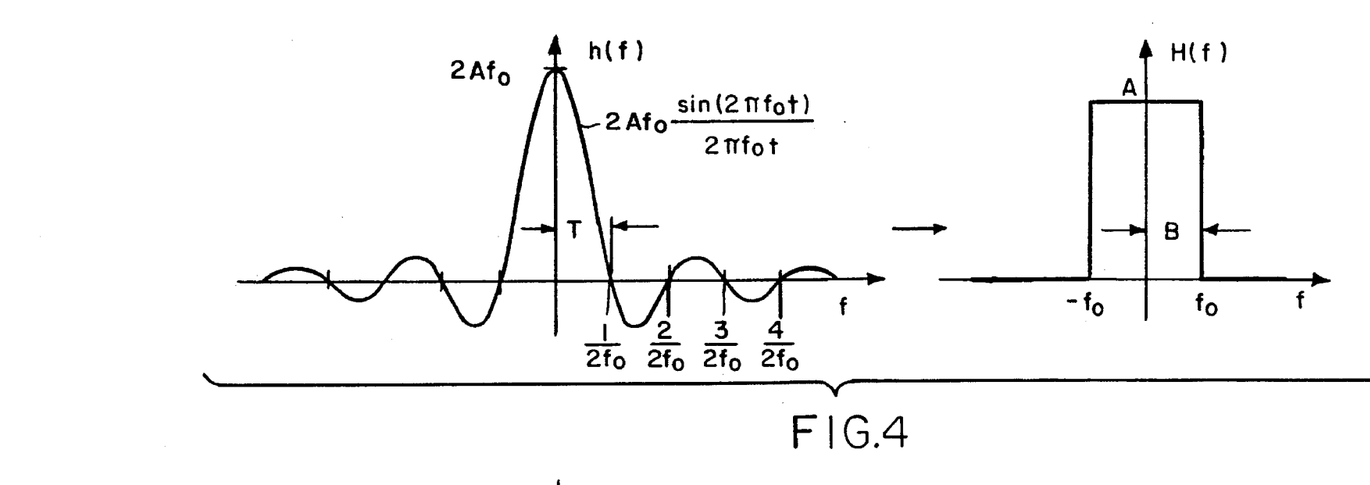
FIGS. 4 and 5 show representations of frequency and time for the purpose of illustrating the similarity theorem of the Fourier transformation for the purpose of illustrating that widening the bandwidth of a spectral coefficient requires narrowing the window function in the temporal range.
Figure 5:
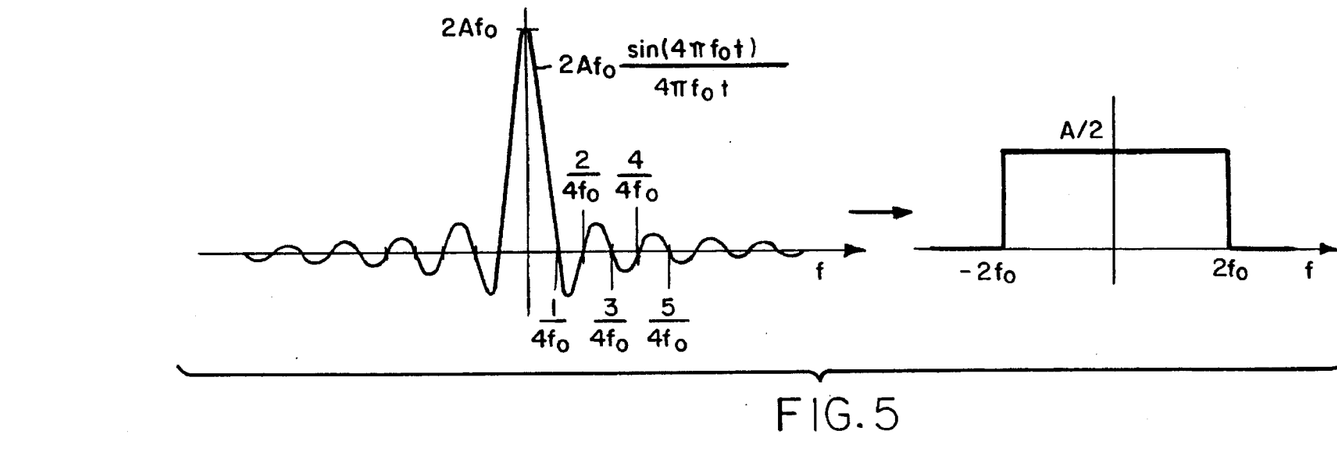

The similarity theorem of the Fourier transformation states that an "expansion" of the bandwidth of a spectral coefficient requires a "compression" of the window function in the temporal range. The temporal resolution T and bandwidth B behave reciprocally with respect to one another. This reciprocity is shown by means of the correspondences, illustrated in FIG. 4 and FIG. 5, of the Fourier transformation. In order to achieve a higher bandwidth, it is therefore necessary to compress the window function in the temporal range; its temporal resolution is thereby improved. The idea on which the transformation according to the invention is based is thus to retain the order of the Fourier transformation (the number of the coefficients), while at the same time ensuring that the higher spectral lines are representatives for wider bands. This also results in identical steepnesses for the filter edges. This is the precondition for a constant total response for the absolute value frequency response, which total response has to be required for use in measurement methods but also, in particular, in coding methods.

A transformation from the temporal range into the frequency range which is faithful to hearing is denoted by a BARK transformation, an equidistant representation of the spectral coefficients being achieved on a BARK axis (and not on a hertz axis). The BARK transformation according to the invention which is developed here differs from other projections (mostly only adapted to hearing) onto the BARK axis in that it works along the Heisenberg limit and thus in a manner faithful to hearing.

Figure 6:
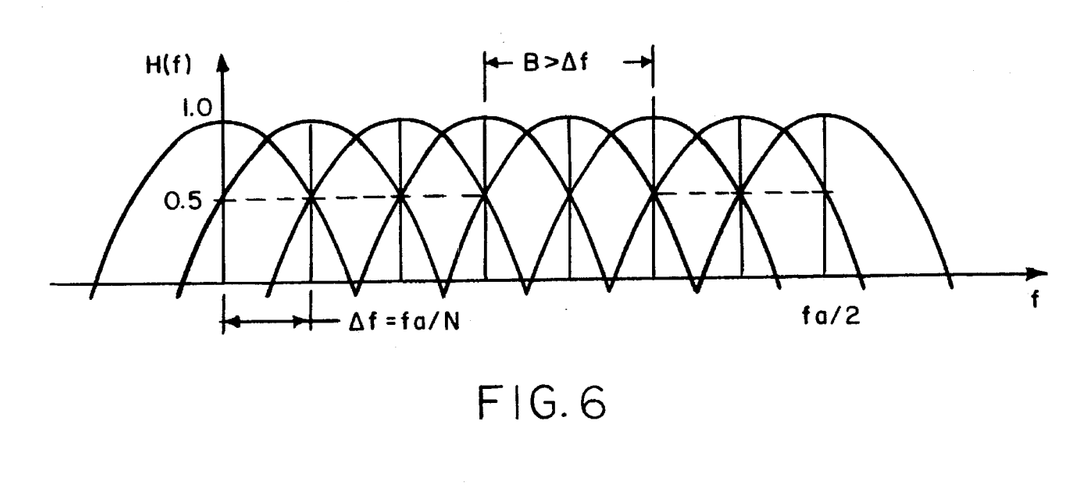
FIG. 6 shows an example of a Fourier transform of a window function which guarantees the conservation of energy.

A Fourier transformation which delivers larger −6 dB bandwidths that correspond to the spacing Δf of the spectral lines, is, or course, incapable of use in the conventional sense (FIG. 6).

Figure 7:
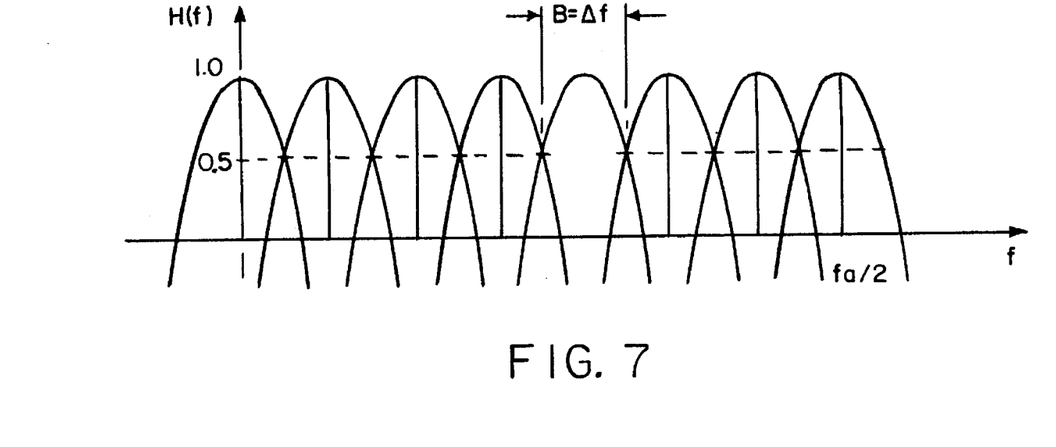
FIG. 7 shows an example of a Fourier transform which has a finer temporal resultion but only a reduced frequency resolution.

Normally, the bandwidth Bn of all spectral coefficients of the Fourier transformation is prescribed by the order N and the sampling frequency $f_a$: $B_n=f_a/N$. The absolute value transfer functions then intersect at |H(f|=0.5, that is to say at the −6 dB points (FIG. 7). However, it is possible from a Fourier transformation modified according to FIG. 6 to make use, for the BARK transformation, only of the lines whose bandwidths or centre frequencies fit into the scheme given by Zwicker for the frequency group widths. The free—at least within a raster—choice of the bandwidth of each coefficient renders superfluous a grouping of some coefficients to form a frequency group with all the disadvantages thereof, such as is necessary in conventional transformation methods adapted to hearing. Because the frequency raster is retained for each line of a BARK transformation which is to be sought anew, it is now possible to juxtapose bands whose width corresponds in an arbitrarily good approximation to the target projection onto the BARK axis. A design along the Heisenberg limit is thereby guaranteed. Staggering is therefore possible "without gaps", because bandwidths are chosen which fit precisely into the Δf raster given by the length of the Fourier transformation. In this case, the total of all the amplitude transfer functions nevertheless remains constant: the edge steepness of the band filters produced in the staggering is a function only of the number of the filter coefficients (the window length), but not of the bandwidth. However, this number is constant and corresponds normally (that is to say, without polyphase addition) to the length of the Fourier transformation. Because all edges have the same steepness, no undesired fluctuations in the total response (total frequency response) occur here.

The window functions present in the form of sampled values need not necessarily have the same number of sampled values which corresponds to the length of the Fourier transformation following the windowing. Rather, it is possible by lengthening the window function beyond the transformation length to achieve an improvement of the edge steepness of the individual filters. The addition theorem of the Fourier transformation also permits sequences longer than given by the transformation length to be transformed into the frequency range. For this purpose, a number of succeeding subblocks are formed from the longer input block, already windowed, of sampled values, added in accordance with the principle of superposition and transformed jointly into the frequency range. This principle is also known as polyphase filtering [Chrochiere, R. E.; Rabiner L.: Multirate Digital Signal Processing, Prentice-Hall, Englewood Cliffs, N.J., 1983]. In particular, polyphase filtering does not affect the temporal resolution, since the slit function on which the filter design is based remains the same.

Furthermore, the invention provides an iteration method which is denoted as a BARK generator and will now be explained. After the stipulation of some parameters, the staggering of the bands is given over to a computer. For each frequency group, this staggering delivers a set of filter coefficients for the time window of a fast Fourier transformation. It has proved to be advantageous to undertake the staggering starting from half the sampling frequency (that is to say, the highest occurring signal frequency) towards lower frequencies, and not vice versa. (Of course, a staggering starting from the lowest frequency occurring in the signal is also possible.) From the outset the staggering does not guarantee that the lower cut-off frequency of the lowermost frequency group will coincide at the end with 0 Hz. However, iterations which deliver lower cut-off frequencies for the lowermost band up to approximately 50 Hz can also be used. A normally inaudible direct component possibly contained in the signal will therefore enter the measurement in a strongly damped fashion. Audio signals do not reach down to a frequency of up to 0 hertz. Thus, in the course of the iteration further bands are staggered below the ones already determined. In this case, the band limits of the bands of frequency group width, but also their centre frequencies fall on a raster which is to be prescribed.

Figure 8:
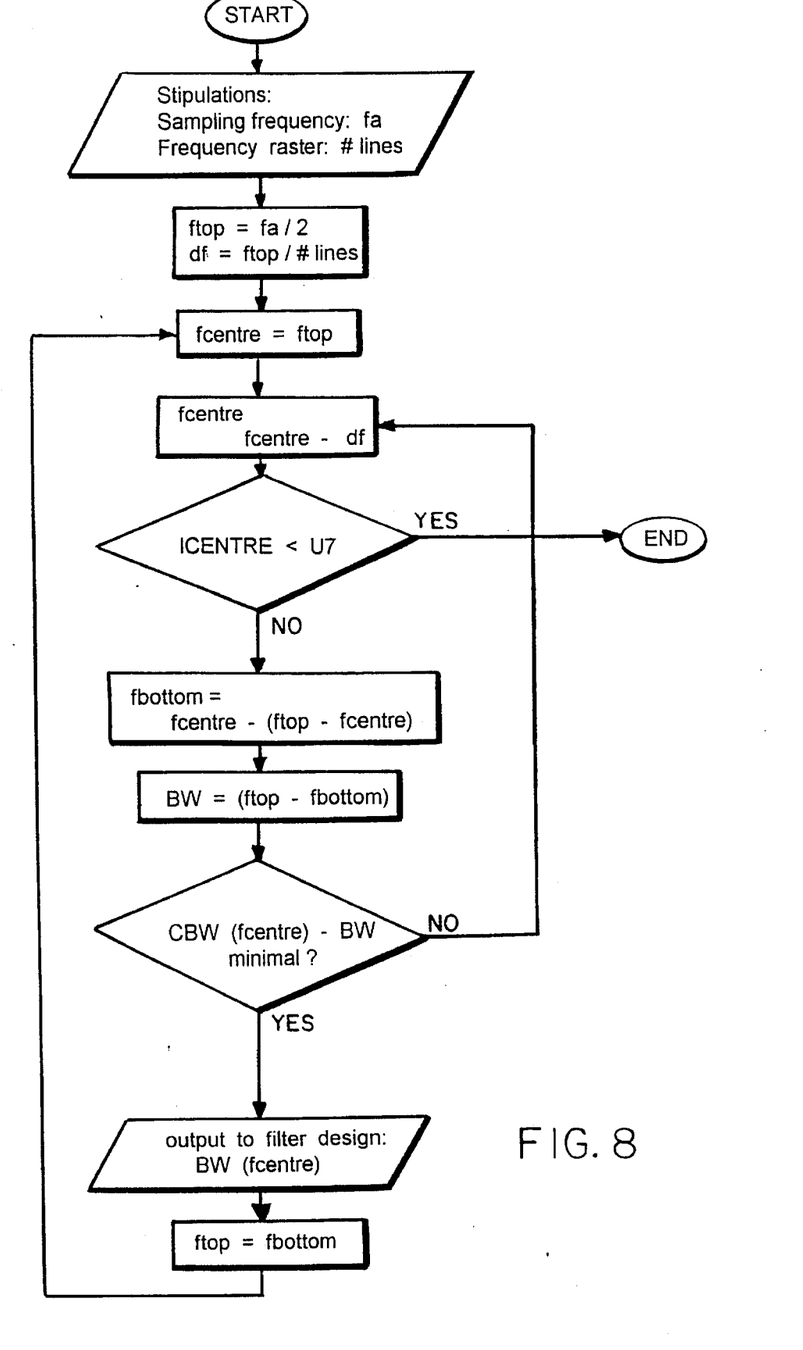
FIG. 8 shows a flow diagram of a BARK generator for determining window functions in the temporal range, which generate spectral coefficients of frequency group width.

The procedure for seeking the sets of coefficients for further window functions follows the flow diagram represented in FIG. 8 (CBW=frequency group width after Zwicker).

The upper band limit is known. It follows from the lower band limit of the time window, already determined as fitting, for the previous, higher frequency group, the basis being 6 dB bandwidths; at the start of iteration, the upper cut-off frequency is set at half the sampling frequency as starting value.

The centre frequency of the band which is to be sought as the next is now displaced on the raster which results from the sampling frequency and the order of the Fourier transformation until a bandwidth which comes closest to the frequency group width of Zwicker is found from the ensemble of possible bandwidths. Given that the frequency raster used is fine enough, the accuracy with which a frequency group width is met will also be as as good as desired.

The bandwidth found yields the set of coefficients for one of the window functions, and thus the temporal resolution of this window in accordance with the Heisenberg limit, that is to say in this case, the requirement in the frequency range determines the variation of the window function in the temporal range. Here, use is made of the filter design method according to Tietze, U.; Schenk, Ch.: Halbleiterschaltungstechnik (Semiconductor circuit engineering), 9th edition, Springer-Verlag, Berlin, 1989.

The lower cut-off frequency of the band found forms the upper cut-off frequency of the band to be determined as next. If the centre frequency becomes negative in the course of the iteration, the truncation criterion is reached.

Figure 9:
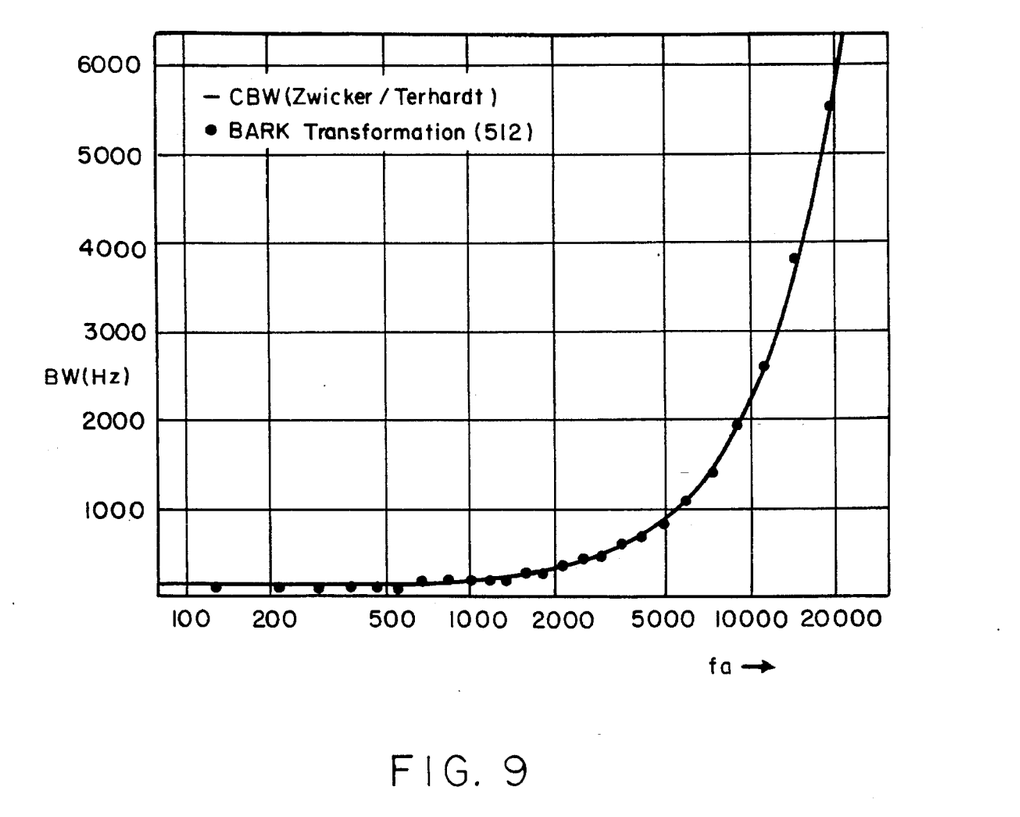
FIG. 9 shows a representation for assessing a BARK generator design.

It is surprising that far fewer than 25 different time windows are required in staggering the bands of frequency group width below one another. This is to be ascribed, on the one hand, to the virtually constant frequency group width at low frequencies down to approximately 5 BARK (cf. FIG. 3); on the other hand, however, it is also decisive that the stipulation of a frequency raster permits precisely only discrete centre frequencies or band limits. As FIG. 9 shows, it is already possible, when given 512 discrete frequencies as far as half the sampling frequency, for the 25 bands of frequency group width to be simulated sufficiently accurately using only 14 different window functions: the assessment of the BARK generator window functions: the assessment of the BARK generator design is immediately possible graphically on screen. The derivative of the bandwidths from the frequency group widths according to Zwicker is already sufficiently small given a relatively coarse frequency raster of 512 discrete frequencies (example in FIG. 9 for 44.1 kHz sampling frequency).

The BARK generator performs the following tasks:

The design is possible in principle for each sampling frequency, but especially for the common sampling frequencies of 44.1 kHz, 48 kHz and 32 kHz; a sampling frequency of 44.1 kHz is customary for musical material on compact disc, sampling frequencies of 32 kHz and 48 kHz are encountered with DAT media (Digital Audio Tape).

Staggering of bands of frequency group width below one another. The accuracy with which the design corresponds to the frequency group width of Zwicker can be controlled by the stipulation of a raster.

For trial purposes, bandwidths can also be set for the subfilters which correspond to fractions of a BARK: this opens up the possibility of simulating the pitch resolution of the human ear of approximately 1/27 BARK.

Calculating and outputting the sets of filter coefficients for the required windows, taking account of the polyphase addition in different output formats. One of the output possibilities is a table of constants, which can be incorporated at once as source text in a programme for BARK transformation. The designation of BARK generator is thus justified.

(In a manner similar to the case of the trivial band filter cascade) bandwidth and temporal resolution of the window functions always yield a design along the Heisenberg limit.

A visual assessment of the iteration results is possible at once by means of the incorporated graphics output. Possible modifications can be performed interactively.

Figure 10:
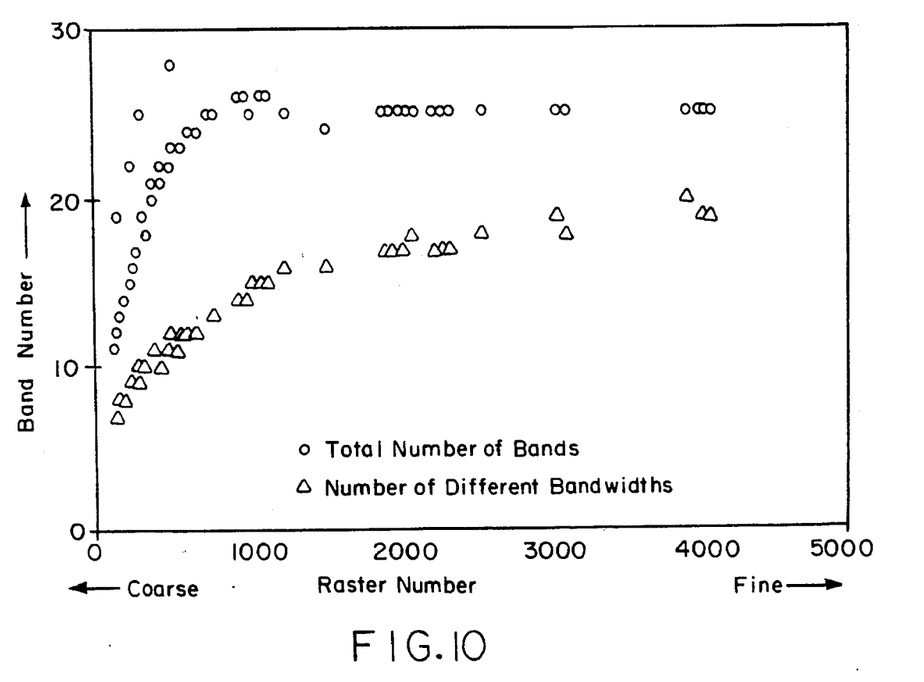
FIG. 10 shows a representation of the iteration result of the BARK generator, as a function of raster width.

A FIG. 10 shows, the iteration runs successfully not for arbitrary frequency rasters, but only in the case of a few specified raster widths. The iteration can always be considered as successful when the lower cut-off frequency of the lowermost band is situated in the range from approximately 0 to 50 Hz. It is favourable for a direct component which is possibly contained in the signal and is, after all, normally inaudible also to enter the measurement in a strongly damped fashion. The passband of the lowermost frequency group need not therefore necessarily reach down to 0 Hz. The total number of the bands into which the frequency range from, for example, 0 to 25.05 kHz is subdivided approaches the frequency group number of 25 with increasing raster number (that is to say, as the frequency raster becomes finer). This number is correct for the sampling frequency chosen in this example.

Figure 11:
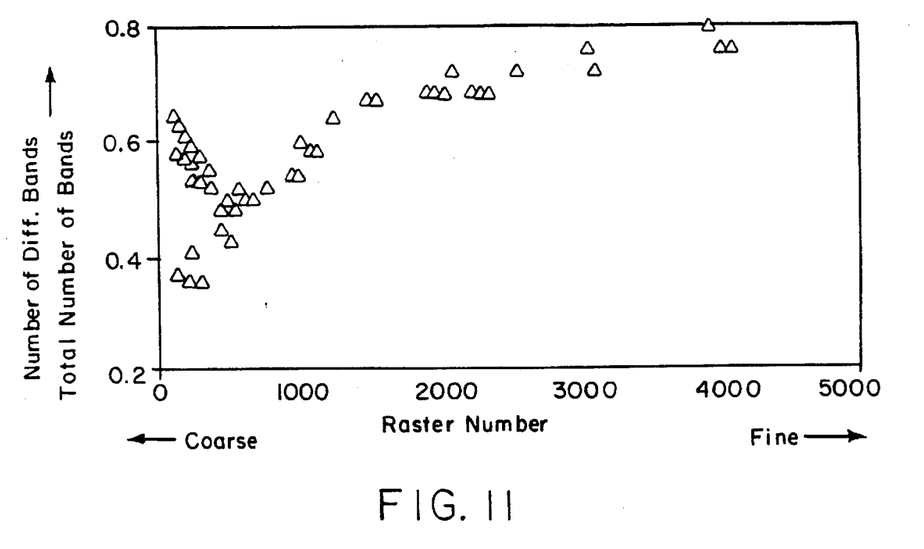
FIG. 11 shows a representation of the quotient of the number of different frequency groups and the total number of bands, as a function of the raster number.

FIG. 10 also shows that the number of different window functions in this case always remains below the total number of frequency groups. A substantial advantage of the BARK generator resides herein: for all practically relevant instances, fewer evaluations of the input vector of the time signal by means of a window function are required than are generated by the transformation of bands of frequency group width. If the quotient is formed from the number of different frequency groups and the number of the bands, the result is a minimum for a raster number of approximately 512 (FIG. 11).

The BARK transformation operates here at its most economical: the lowest number of different bands is required in the ratio. Although even smaller raster numbers are possible, they lead in this example to deviations from the frequency group width according to Zwicker which are not longer satisfactory.

Measures for Reducing the Computational Outlay

The computational outlay for determining a complete BARK transformation is still relatively high, since it is necessary to calculate a new discrete Fourier transformation for each different window. This mode of operation is clearly very uneconomical in conjunction with a computational potential which is available mostly only to a limited event, since most of the calculated Fourier coefficients are discarded; only very few coefficients (in many cases even only a single one) are further used for the BARK transformation.

Figure 12:
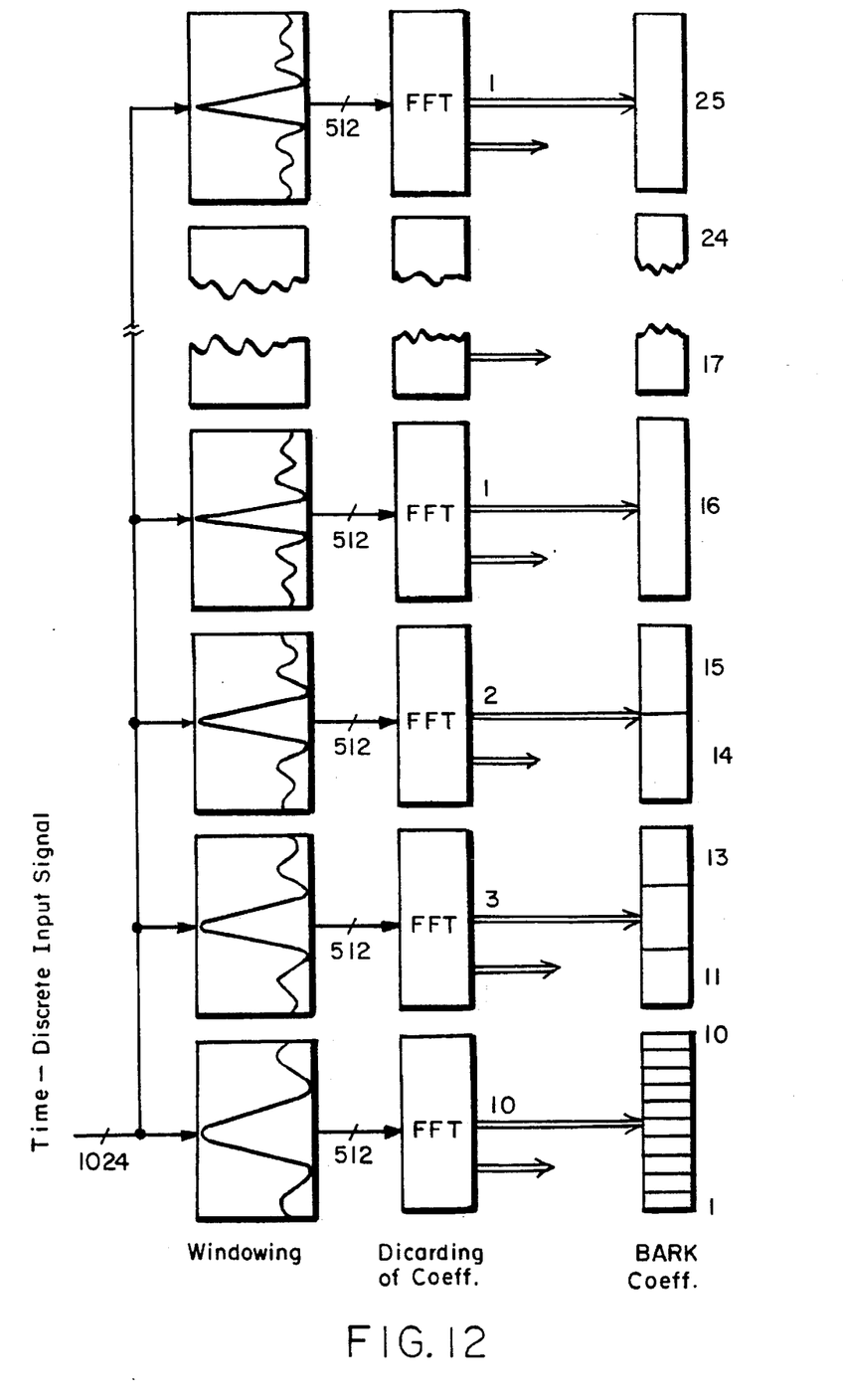
FIG. 12 shows a block diagram of a device for carrying out the BARK transformation on the basis of a 512-point FFT.

As indicated in FIG. 12, a BARK transformation based on a 512 point FFT can already be calculated using only 11 different subwindows. However, in the calculation of the coefficients for the 25 subfilters of frequency group width via a fast Fourier transformation (FFT) it is necessary to discard 99.56% of all FFT coefficients, only 25 of 5632 calculated coefficients being actually used.

FIG. 12 illustrates the wastage of computational capacity in an example with 11 different windows and a raster of 512 discrete frequencies up to the sampling frequency: because of the approximately linear relationship between the frequency group width and centre frequency in this frequency range, it is still possible to use one and the same time window for the lowermost 10 spectral lines. A new time window, and thus a new common FFT, are required for the following 3 bands (11 to 13). This also applies to the subsequent 2 frequency groups; it is only starting from the 16th frequency group upwards that a new time window must respectively be used per frequency group. In the first FFT, 502 of 512 coefficients are thereby discarded, then 509 of 512, 510 of 512, and finally 8 times 511 of 512. Overall, only 25 of 11×512=5632 coefficients are used. It is therefore necessary to calculate 5607/25=224 times more complex Fourier coefficients than are then used for the BARK transformation. However, as sketched by way of example in FIG. 12, calculating the BARK transformation via a number of fast Fourier transformations respectively having different time windows would produce a disproportionately high computational outlay if a more efficient method than the fast Fourier transformation were not used to calculate individual coefficients.

A trivial possibility of calculating only one coefficient of a Fourier transformation consists in applying the conditional equation for a discrete Fourier transformation. However, more advantages are offered by the use of the Goertzel algorithm for calculating individual lines [Goertzel, G.: An Algorithm for the Evaluation of Finite Trigonometric Series, Amer. Math. Monthly 65 (1968), p. 34–35].

Starting from the z-transformation X(z) of a sequence x(n) of sampled values of length N $$X(z) = \sum_{n=0}^{N-1} x(n) \cdot z^n$$

the result is the discrete Fourier transformation (DFT) with $$z = W^k = (e^{-j2\pi/N})^k = e^{-j2\pi k/N}.$$

Discrete frequencies are selected via k.

The DFT can also be specified as a polynomial by means of the substitution $z^n = W^{nk} = e^{-j2\pi nk/N}$. For example, the result for N=4 is a third order polynomial $$X(z) = x(3) \times z^3 + x(2) \times z^2 + x(1) \times z + x(0).$$

The multiplications by the powers of z are resolved using Horner's rule:

$$X(z) = ((x(3) \times z + x(2)) \times z + x(1)) \times z + x(0).$$

By introducing a new variable y(n), it is possible from this to specify a linear difference equation $$y(n) = z \times y(n-1) + x(N-n).$$

The initial condition is y(0)=0 in this case. The result desired for the Fourier transform is found for n=N as $$X(z) = y(N).$$

Figure 13:
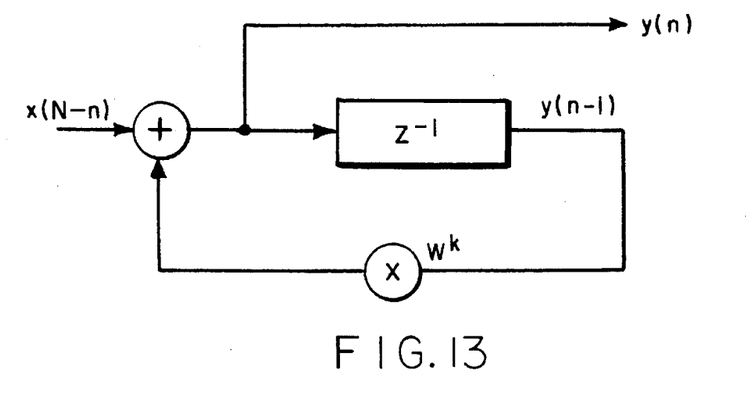
FIG. 13 shows a first order recursive filter for forming the Goertzel algorithm.

The linear difference equation can also be regarded as a first order recursive filter. Substitution $Z^n = W^{nk}$ made at the beginning is cancelled again for this purpose.

$$y(n) = W^k \times y(n-1) + x(N-n); \quad y(0) = 0$$

The arrangement resulting from this is reproduced in FIG. 13.

The input sequence must, however, be present in inverse sequence.

Moreover, the fact that the state variable y(n−1) is fed back to the filter input via a complex coefficient $W^k$ has a disadvantageous effect on the stability and the computational outlay for the filter.

Although the number of the multiplications and additions is the same as in the case of the direct calculation of the discrete Fourier transformation, there is no need here for the twiddles to be explicitly calculated or made available via a twiddle table; rather, due to the recursive mode of calculation they are further rotated in each pass, starting from an initial value, for a newly added sampled value of the input sequence x(n).

The number of the required multiplications can be reduced by half by using the Euler equation $$W^k = e^{-j2\pi k/N} = \cos(2\pi k/N) - j\sin(2\pi k/N)$$

going over to an indexed notation $$y_n = W^k y_{n-2} + x_{N-n} = [\cos(2\pi k/N) - j\sin(2\pi k/N)] \times y_{n-1} + x_{N-n})$$

where $y_{n-1} = [\cos(2\pi k/N) - j\sin(2\pi k/N)] \times y_{n-2} + x_{N-n+1}$.

After a few further transformations, the final result for $y_n$ is $$y_n - [2 \times \cos(2\pi k/N)] \times y_{n-1} + y_{n-2} = -x_{N-n} + [\cos(2\pi k/N) + j\sin(2\pi k/N)] \times x_{N+1-n}.$$

Figure 14:
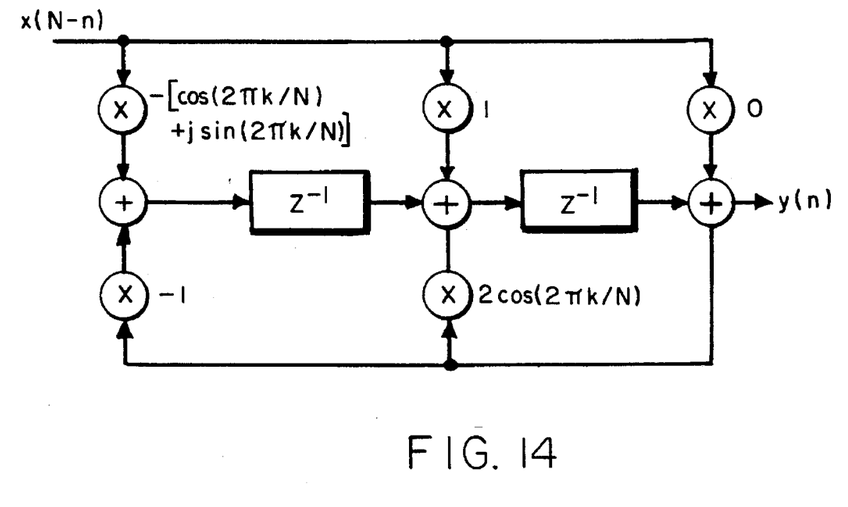
FIG. 14 shows a second order recursive filter for forming a second degree Goertzel algorithm.

Through a comparison with the general second order difference equation $$y(k+2) + c_1 \times y(k+1) + c_0 \times y(k) = b_2 \times x(k+2) + b_1 \times x(k+1) + b_0 \times v(k)$$

it is possible to specify the filter coefficients for a second degree recursive filter in the first canonical basic form, which filter can be represented as shown in FIG. 14

$c_1 = -2 \times \cos(2\pi k/N)$;

$c_0 = 1$ $b_2 = 0$;

$b_1 = (2\pi k/N) + j\sin(2\pi k/N)$;

$b_0 = 1$

In this form, the equation has real coefficients for the feedback, but a complex input coefficient.

Figure 15:
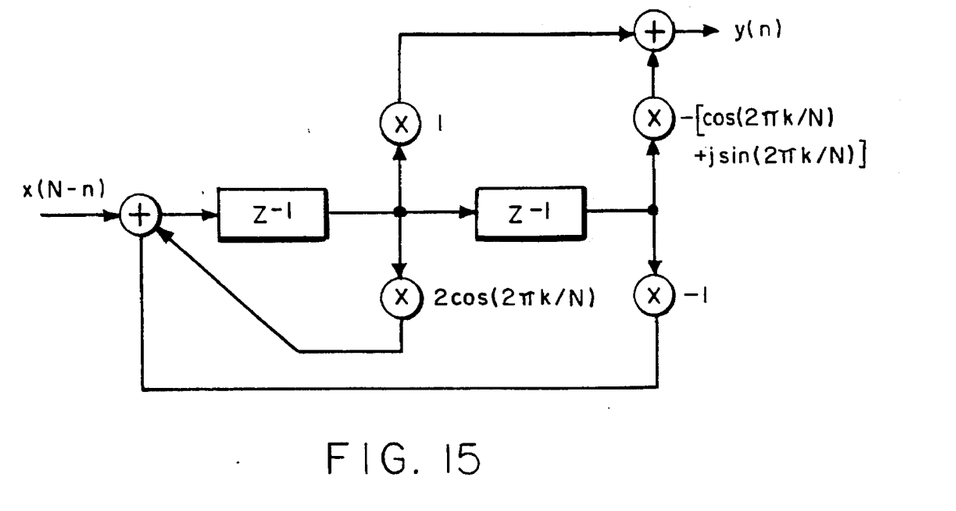
FIG. 15 shows a transposed structure of a filter for forming a second degree Goertzel algorithm.

The second degree recursive filter in the second canonical structure can—as shown in FIG. 15—be transposed further.

Since the input sequence is purely real, but is present at the input in inverse sequence, it holds for the odd component of the input sequence that $$h_u(t) = -h(t).$$

However, the odd component $h_u(t)$ delivers only the odd imaginary part of the Fourier transformation; if the input sequence is fed in in non-inverse sequence, the imaginary part of the Fourier transforms only need to be negated.

Figure 16:
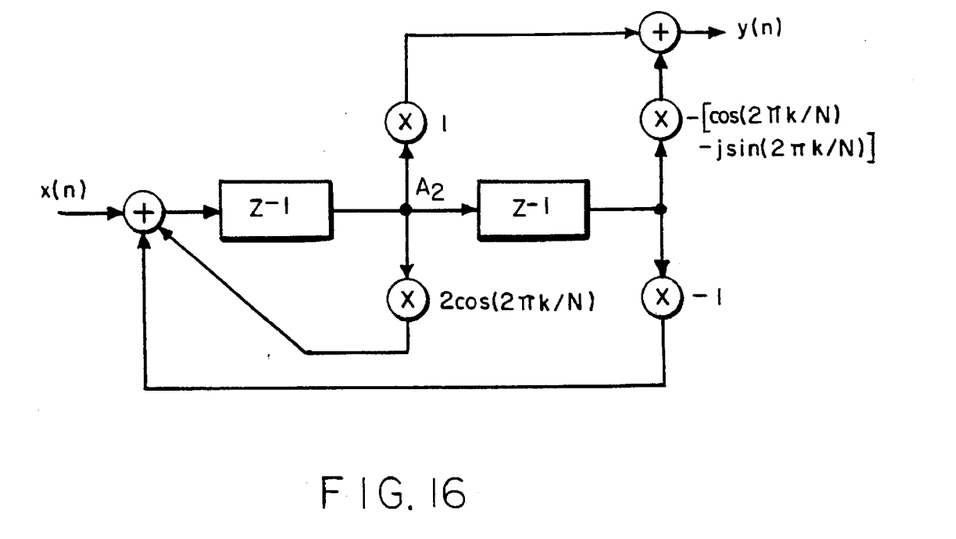
FIG. 16 shows a preferred embodiment of a recursive filter for forming the second degree Goertzel algorithm, as a device for calculating a coefficient of the BARK transformation.

FIG. 16 shows the final version of the Goertzel algorithm. The input sequence x(n) is now present at the input in normal sequence. The output value need only be determined if the input vector x(n) has been completely processed. In order to calculate a spectral line, it is advantageous firstly to permit all values of the input sequence x(n) to "run into" the filter, and only then to calculate the output value y(n) from the state variables $A_1$ and $A_2$ via a complex multiplication.

Figure 17:
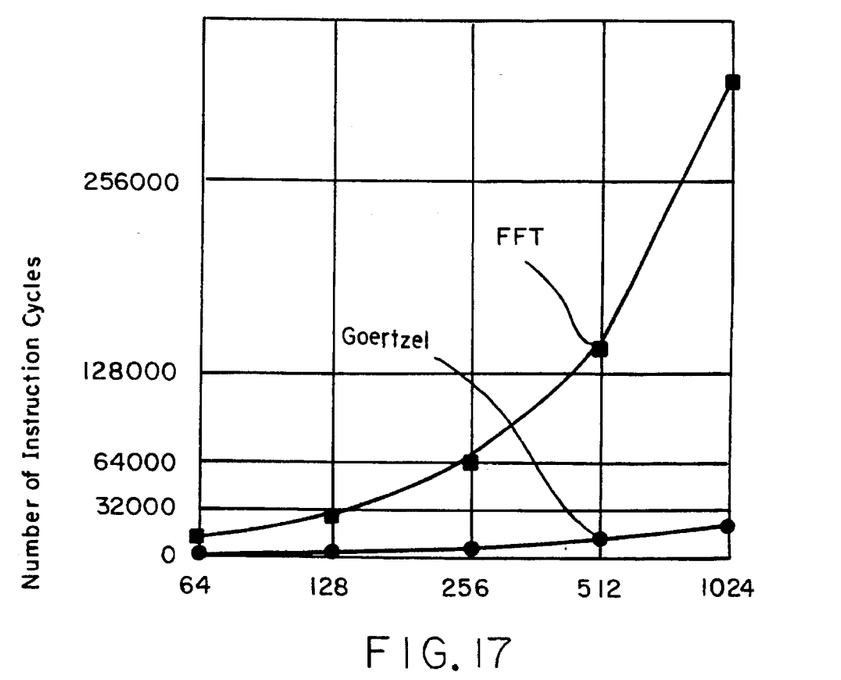
FIG. 17 shows a representation for comparing the computational outlay for a complex spectral coefficient given the use of a fast Fourier transformation with respect to the Goertzel algorithm, plotted against different transformation lengths N.

It is thus possible using this little known algorithm to calculate individual lines of a discrete Fourier transformation; the structure used in this case can also be regarded as a recursive filter. A particular advantage by comparison with the FFT is that there is no need here for a twiddle table. Moreover, only purely real additions and multiplications occur inside the filter. A complex multiplication is required only at the filter output; moreover, this need be calculated only once for the purpose of calculating a BARK coefficient. The outlay on calculating a coefficient using the Goertzel algorithm is lower in the practical realization on a modern TMS320C30 single-chip signal processor than for a complete FFT. (FIG. 17 shows the computational outlay for different transformation lengths N).

Figure 18:
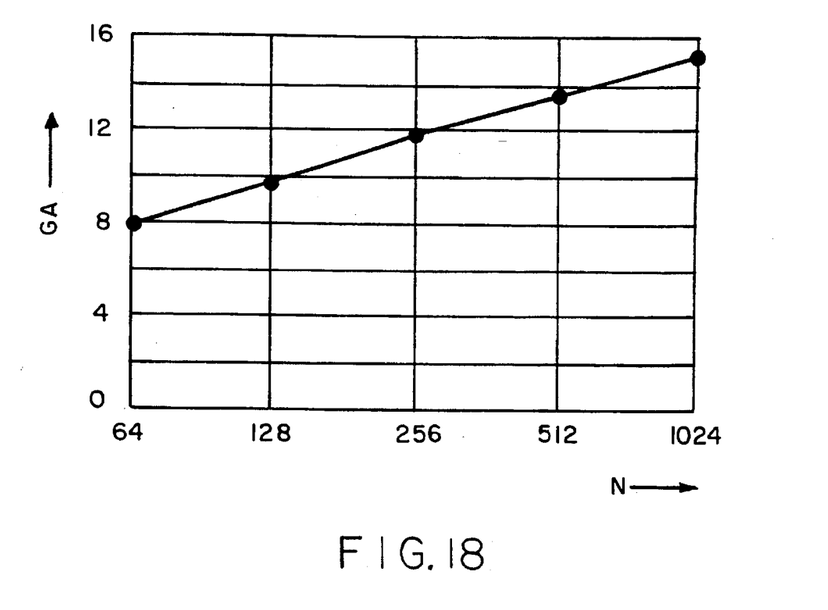
FIG. 18 shows a representation of the number GA of the Goertzel algorithms which can be calculated on a signal processor within the required computational time for a fast Fourier transformation, plotted against different transformation lengths N.

In addition, FIG. 18 shows that within the computing time required by a fast Fourier transformation it is even possible in many instances to calculate a few Goertzel algorithms. As emerges from the two FIGS. 17 and 18, it is, for example, more favourable in the case of a transformation length of N=512 to calculate individually up to 13 spectral coefficients by means of the Goertzel algorithm than by means of a fast Fourier transformation. When the Goertzel algorithm is used in the BARK transformation, a very considerable speed advantage is thereby obtained. The computational outlay for the example specified in FIG. 12 is thereby enormously reduced; in most instances, it is even the case that only one spectral coefficient need by calculated. Although it is possible to calculate a fast Fourier transformation by means of a number of coefficients which does not correspond to a power of 2, the calculation generally leads to a disproportionately high outlay because of the complicated structure of the methods which are to be used in this case.

A further advantage of the Goertzel algorithm resides, by contrast, in that it is possible to calculate arbitrary frequency rasters using the same method, (that is to say, using the same programme). All that this requires is to prescribe anew the length of the input vector and the angle $2\pi k/N$ in accordance with the line k to be calculated. Although the Goertzel algorithm operates as a recursive filter at the stability margin, stability problems (for example, overflowing of the arithmetic-logic unit) nevertheless do not occur, since the algorithm is set up anew once again after the calculation of each coefficient of the BARK transformation.

By comparison with the example given in FIG. 12, the result for the BARK transformation is thus a substantially (by a factor of 224) lower total outlay for the purpose of determining the short-time spectrum faithful to hearing: 25 Goertzel algorithms for calculating the complex BARK coefficients of the 25 subbands and 11 polyphase windows for setting the 11 different bandwidths.

Figure 20:
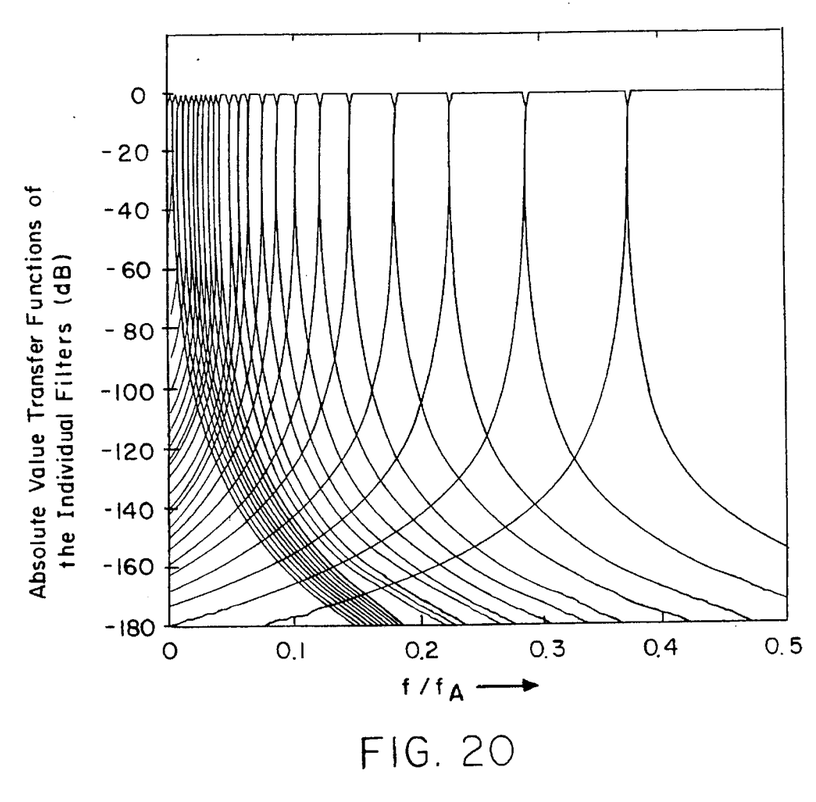
FIG. 20 shows a representation of the absolute value transfer function of the individual filters of a BARK transformation.

The two subalgorithms essentially exclusively require multiplication and addition operations, and are therefore predestined for execution on a signal processor. The consistent application of the principle of reciprocity and the polyphase filtering lead to the absolute value transfer functions, specified in FIG. 20 for a sampling frequency of $f_a$=44.1 kHz, of the individual filters of a BARK transformation, plotted against a linear frequency axis standardized to the sampling frequency of $f_a$=44.1 kHz. The BARK transformation has a constant response in the passband, an excellent stop band attentuation and an outstanding far-off selection (no secondary lobes).

Figure 19:
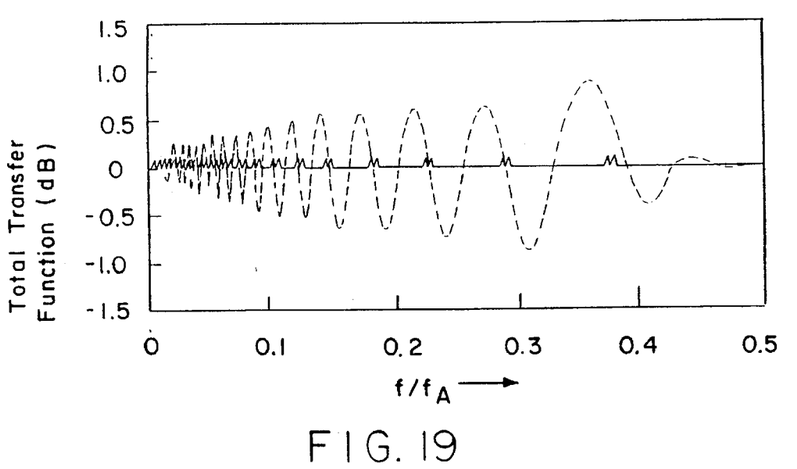
FIG. 19 shows a representation of the frequency response as the total of the amplitude transfer functions.

The frequency response of the total of the amplitude transfer functions of the specified BARK filter cascade is specified in FIG. 19.

Characteristics of the BARK Transformation

In the form presented here, the BARK transformation has many ideal properties. The disadvantages of conventional harmonic analyses by means of transformation methods and subband methods can be overcome thereby. The main advantages of the BARK transformation are:

Frequency resolution faithful to hearing: the BARK transformation follows the relationship, determined by Zwicker, for the frequency group width at the respective centre frequency. The error which is produced by the stipulation of a frequency raster in the iterative determination of the cut-off frequencies of the subbands of frequency group width can be kept as small as desired if only the raster is fine enough.

Finest possible temporal resolution: the pulse response of a (bandpass) filter can be regarded as a window function for a transformation. In the frequency range, the transformation coefficients are representatives of the (Fourier) transforms of the window in the temporal range. Consequently, the resolution in the temporal range must also vary given the variation of the "bandwidth of a coefficient". In the case of the BARK transformation, for each frequency group the product of the bandwidth B and the temporal resolution T is therefore constant and at the same time minimal: $B \times T=0.5$. This limit, which is referred to as the Heisenberg limit, cannot be undershot by any other frequency analysis. The filter design along the Heisenberg hyperbola guarantees that neither the temporal resolution nor the bandwidth of the subbands is worsened by the BARK transformation.

Linear phase subfilters: on the basis of the linear phase nature of the subfilters and the indicated ideal characteristics of the absolute value transfer functions resulting from the iteration, the BARK transformation in this form can be regarded as best suited for simulating the auditory property of forming frequency groups. The linear phase subfilters require no correction of propagation time by means of all-pass filters. Since, in addition, the filter lengths are the same for all subfilters, there is also no need to match propagation times by means of time-delay elements.

Rectangular subbands: the iterative filter design can be performed interactively on a computer using the window method. Despite the truncation of the slit function to a finite length, the design guarantees absolute value transfer functions for the subbands of frequency group width which are distinguished by a constant passband and a good far-off selection because of the lack of secondary lobes. Moreover, a virtually constant response of the entire filter bank is achieved. Not the least contribution to the excellent characteristics, above all the high edge steepness in conjunction with a relatively low outlay on realization by comparison with individual bandpass filters is made by the polyphase filtering.

Economical realization: the fact that the frequency group widths are virtually constant in the lower frequency range is utilized in the realization. It is therefore necessary to multiply by far fewer window functions in the temporal range than subbands produced according to the transformation.

The frequency analysis, found using the BARK transformation, over virtually rectangular subbands forms the ideal starting point for the further development of a measurement method faithful to hearing, on the one hand, and a coding method adapted to hearing, on the other hand. The transformation method can, in addition, also be transferred to other applications in which a transformation of equidistant sampled values from the temporal range into the spectral range is required, the spectral coefficients being arranged in a non-equidistant fashion on the frequency axis and there being, nevertheless, a requirement for the Heisenberg condition to be fulfilled.

We claim:

1. A frequency analysis method that simulates perception characteristics of human hearing, comprising the steps of:

extracting from an input signal a sequence of blocks of discrete sampled values, wherein successive blocks of the sequence overlap each other in time;

concurrently windowing one of the successive blocks using a plurality of differing, symmetrical window functions of substantially identical length, each window function having a corresponding Fourier transform with a different bandwidth, to produce a plurality of windowed blocks of weighted sampled values; and performing a Fourier transformation on each windowed block wherein for each windowed block at least one coefficient is generated having assigned thereto the bandwidth of the Fourier transform of the window function used to produce the windowed block, and wherein the at least one coefficient for each windowed block is chosen such that bandwidths assigned to the chosen coefficients of the plurality of windowed blocks adjoin one another approximately without gaps and in a manner approximately free from overlapping.

2. The frequency analysis method according to claim 1, wherein the step of windowing further includes a step of:

weighting each of the plurality of windowed blocks by applying differing sinx/x window functions having zero crossings situated at sampling instants of the discrete sampled values, a temporal resolution of the windowed block corresponding to a mutual spacing of the zero crossings, and the temporal resolution being inversely proportional to twice the bandwidth of the Fourier transform of the window function to which the Fourier transform corresponds.

3. The frequency analysis method according to claim 2, wherein the step of performing the Fourier transformation includes steps of:

performing a discrete fast Fourier transformation (FFT) which delivers in a frequency domain a number of coefficients corresponding to a number of input values in a time domain of a respective window function, having a separation in the frequency domain between each of the number of coefficients that corresponds to a sampling frequency of the input signal divided by a length of the discrete fast Fourier transformation, and whose bandwidth is prescribed by the bandwidth of the Fourier transform of the respective window function; and selecting only those coefficients from the number of coefficients by which it is possible, in conjunction with coefficients available in a time-parallel fashion from discrete fast Fourier transformations on others of the plurality of windowed blocks of weighted sampled values, to construct a cascade of band filters in a case of other centre frequencies, so that resulting frequency bands adjoin one another approximately without gaps.

4. The frequency analysis method according to claim 2, wherein to improve selection properties of a cascade of band filters produced by the method, a length of the plurality of differing window functions is a multiple of a Fourier transformation length of the corresponding Fourier transform, and wherein the method further comprises a step of, before transformation, reducing a multiplicity of windowed discrete sampled values to the Fourier transformation length by division and additive superposition of the windowed discrete sampled values.

5. The frequency analysis method according claim 2, wherein a first of the at least one chosen coefficient is generated from the input signal using a second order Goertzel algorithm.

6. The frequency analysis method according to one of claims 1 to 5, further comprising:

an iterative method for determining discrete centre frequencies and band limits for defining the window functions, the iterative method including steps of:

(A) setting a running frequency variable ($f_{centre}$) to a start frequency ($f_{top}$) which lies on a frequency raster chosen by a length of the Fourier transformation;

(B) displacing the running frequency variable ($f_{centre}$) by one step (df) on the frequency raster;

(C) determining a bandwidth resulting from a given, nonlinear function of the centre frequency; and (D) repeating steps B and C until a band limit of the band belonging to the running frequency variable ($f_{centre}$) coincides with a band limit of a previously determined band.

7. The frequency analysis method according to claim 6, wherein the given, nonlinear function is a relationship between the centre frequency and a frequency bandwidth in which acoustic events are jointly perceived.

\* \* \* \* \*